United States Patent [19]
Keith

[11] 3,963,813
[45] June 15, 1976

[54] CUSPATED SHEET FORMING

[75] Inventor: Donald George Keith, Mount Eliza, Australia

[73] Assignee: The United States of America as represented by the Secretary of the Navy, Washington, D.C.

[22] Filed: May 12, 1975

[21] Appl. No.: 576,782

Related U.S. Application Data

[63] Continuation-in-part of Ser. No. 536,291, Dec. 24, 1974, abandoned, which is a continuation-in-part of Ser. No. 307,211, Nov. 16, 1972, abandoned.

[52] U.S. Cl. .............................. 264/167; 264/165; 264/292; 264/322
[51] Int. Cl.² ....................... B29B 3/02; B29C 17/03
[58] Field of Search ............ 264/322, 324, 92, 291, 264/292, 165, 167

[56] References Cited
UNITED STATES PATENTS

| | | | |
|---|---|---|---|
| 2,878,513 | 3/1959 | Slaughter | 264/292 X |
| 3,169,274 | 2/1965 | Colombo | 264/286 X |
| 3,220,544 | 11/1965 | Lovell | 264/292 X |
| 3,682,760 | 8/1972 | Fairbanks | 264/291 X |
| 3,724,673 | 4/1973 | Ryon | 264/92 X |

FOREIGN PATENTS OR APPLICATIONS
66,115    1967    Australia

Primary Examiner—Richard R. Kucia
Attorney, Agent, or Firm—G. J. Rubens; Henry Hansen

[57] ABSTRACT

A process of manufacturing a cuspated sheet comprising deforming a sheet of thermoplastic material by pressing against one face of a molten sheet of the material the cold outer tips of a first array of pointed pins set in a first block and simultaneously pressing against the second face of the material the cold outer tips of a second array of projections set in a second block so that the arrays interpenetrate in such a manner that the projections on the second block are spaced from the projections of the first block by a distance greater than the thickness of the sheet and wherein the temperature of the cold outer tips of the arrays is less than the melting point of the thermoplastic material.

9 Claims, 15 Drawing Figures

CUSPATED SHEET FORMING

This is a continuation-in-part of abandoned application Ser. No. 536,291, filed Dec. 24, 1974 as a continuation of abandoned application Ser. No. 307,211, filed Nov. 16, 1972.

This invention relates to shaped products and to a process of forming shaped products; in particular it relates to a process and apparatus for forming thermoplastic materials and to the shaped products obtained by the process.

In the past thermoplastic sheet materials have been formed into desired shapes by hot-shaping techniques employing differential fluid pressure, with or without mechanical traction to stretch the sheet onto or into a mould; such moulding techniques are for example drape moulding and vacuum forming. Suitable thermoplastic materials in these hot-shaping techniques have the property of being elastic when raised to a temperature at which the material may be thermoformed; the hot thermoplastic film or sheet requires substantial tensions to stretch it, and the sheet while hot is able to transmit, sustain and distribute tensions so that in a forming process the tension over the sheet is approximately uniform and extreme local thinning is prevented. However such sheet, drawn over sharp prominences or into deep narrow cavities, receives such a concentration of tension that such "peaks" or "pits" are commonly the thinnest regions of the formed shape. Examples of materials suitable for vacuum forming and similar techniques are plasticised polyvinyl chloride film high impact polystyrene polyacrylates and ABS (acrylonitrile/butadiene/styrene) sheet materials.

Certain other important thermoplastics lack rubbery qualities at elevated temperatures, and sheets comprising these materials instead of becoming elastic have the properties of a membrane of high viscosity fluid. Materials with these properties include polyolefines, nylons, polyethylene terephthalate, inorganic glasses and certain synthetic rubbers such as 'Krayton' or 'Solprene' 414 (Trademarks for synthetic rubbers). Many of these materials are valued as fibre-forming materials suitable for the melt spinning of fibres. These fluid-melt materials are not well suited for vacuum forming or related techniques, since high local pressures tend to cause calamitous local thinning or puncture. It is indeed somewhat paradoxical that materials which exhibit unmatched extensibility in melt spinning of fibres should perform poorly in the pneumatic stretching of films.

We have now found a new process of forming thermoplastics and which is especially applicable to thermoplastic materials having melts of a fluid nature at the thermoforming temperature.

Accordingly we provide a process of thermoforming materials which process comprises deforming a sheet of the thermoplastic material by pressing against one face of the hot sheet of material an array of cold projections, and simultaneously pressing against the second face of the sheet of material a second array of cold projections so that the arrays interpenetrate in such a manner that the projections on the second array are spaced from the projections on the first array by a distance greater than the thickness of the sheet.

By hot we mean at a temperature sufficient to allow the thermoplastic material to be thermoformed preferably at a temperature higher than the melting point of the thermoplastic material, most preferably the thermoplastic material forms a melt of a fluid nature at the thermoforming temperature. By cold we mean at a temperature insufficient to allow facile thermoforming preferably at a temperature lower than the melting or softening point of the thermoplastic material.

One of the arrays of projections may take the form of an apertured grid through which apertures the projections of the other array may penetrate and in this case a 'singly cuspated' sheet is obtained. In its most typical form the process involves the interdigitation of two arrays of needle points or knife edges and a 'doubly cuspated' sheet is obtained. However we do not exclude from our invention the use of an array or arrays comprising blunt projections.

The sheet will not normally be drawn to any appreciable extent where it contacts the surface of a cold projection. Indeed wherever a cold projection makes contact with the hot sheet a chilled slug of material will form, and the greater the cooling capacity of the projection the greater the mass and area of the chilled slug will be. However we may optionally control or reduce the size of the chilled slug by reducing the cooling capacity of the projection by all or some of these expedients: first, by using projections of small volume and very low subtended area such as sharp slender needles or blades, second by using projections of lower specific heat and/or thermal conductivity, third by limiting the coldness of the projections so that the temperature difference between the hot sheet and the projection is such as to limit the amount of chilled slug. Since it is a main purpose of our technique to operate on every part of the hot sheet to draw and restructure it, we normally prefer to use arrays of very sharp projections at such a temperature that the chilled slugs are merely adequate to act as ferrules on the needle tips transmitting tension enough to draw the uncooled sheet area, the said ferrules also preventing puncture. The materials which perform most aptly in our process are substances which while at working temperature are easily extensible under very low forces, but which are strong tenacious materials at a somewhat lower temperature.

The nature of the product obtained in our process depends upon the nature of the thermoplastic material and the temperature and speed at which the interdigitation of the two arrays is carried out. In general thermoplastic materials which may be melt spun will, if formed in the process of our invention at a temperature in the range required for satisfactory melt spinning, produce a deep drawn unperforated cuspated sheet, except that a perforated cuspated sheet will be produced if the speed at which the interdigitation is carried out is so fast that the material cannot stretch sufficiently fast to relieve build up of tension on the points of the arrays of projections.

Materials having poor melt spinning characteristics also behave poorly as a feed material for the process of our invention. Thus, for example, plasticised polyvinyl chloride may be formed by our process but the product will contain many perforations unless the process is carried out reasonably slowly and the polyvinyl chloride heated to a temperature just below its decomposition point. Thus materials having good melt spin properties may be highly deep drawn by our process at high speed but materials having poor melt spin properties may only be deep drawn to a very limited extent and the speed of the process is relatively low. For any particular thermoplastic material the most suitable temperature and speed at which the process of our invention should be carried out must be found by simple experiment.

The preferred thermoplastic materials having good melt spin properties are well known in the art and include, for example, vinyl polymers such as certain polyvinylidene chloride copolymers and certain copolymers of ethylene and vinyl alcohol; polyolefins such as low density polythene, high density polythene, polypropylene, high impact polystyrene and poly(4-methylpentene-1); polyesters such as poly(ethyleneterphthalate) and poly[1,(1-bis(methylene)-cyclohexanetereph- thalate(1'2-cis:trans)]; polyamides such as nylon 66, 610, 6 and 11; inorganic glass such as soda or borosilicate glass; supercooled liquid sugar solution such as toffee; and thermoplastic rubbers.

It is not hitherto proved possible to manufacture the cuspated sheet formed by our process by any of the thermoforming processes known in the art and therefore in a further aspect of our invention we provide a cuspated sheet having two faces each comprising an array of tips of hollow projections wherein the part of the cuspated sheet inter-connecting the tips of the projections has a substantially minimum surface area and wherein the tip of each projection is thicker than the parts of the sheet connecting the tips, and wherein the ratio of height of cusp to maximum diameter of cusp is greater than 2:1.

The individual cusps on the cuspated sheet may be considered to a first approximation to lie within regular cones and the maximum diameter of the cusp is the diameter of the base of the corresponding regular cone.

The cuspated sheets have several unexpected properties.

1. The compressive strength as tested normal to the plane of the cusps at optimum depth of draw is considerably higher than that of a foamed material of the same substance at the same bulk density. This is a consequence of the generation of these cuspated sheets by pure tension yielding geodetic forms without structural redundancy.

2. The cuspated sheets exhibit highly anisotropic properties and their sidewise compressive strength (normal to the axis of the cusps) is lower than in foamed materials of the same substance and bulk density.

3. Cuspated sheet is extremely pliable because of its exceptionally contorted surface.

4. Although cuspated sheet is an unperforated membrane, any cusp is connected to cusps on the other side of the neutral axis by a very tortuous path: hence local forces acting on the cusps of one side tend to cause only small deflections of the cusps on the other side.

5. Cuspated sheet can "nest" and, though "bulky", many sheets can be stored in small volume. For like reasons sheet edges can "lock" to each other.

Alternatively by choice of design the depth of nesting can be limited. We have found that when sheets of different initial thickness of the same material are formed into cuspated sheets of our invention that for any given expanded bulk density the compressive strength varies with change in ratio of depth of draw to maximum cusp diameter. The optimum ratio of depth of draw to maximum cusp diameter for any given bulk density may be found by simple experiment. The individual cusps on the cuspated sheet may be considered as regular cones and we have found that for optimum compressive strength the ratio of the height of the cone (depth of draw) to the maximum diameter of the cone is in the range from 2:1 to 3:1. We have found that when the cuspated sheets are laminated as described hereinbelow that optimum properties are obtained when the ratio is greater than for the unlaminated core. The products from our process may be used as cores for composite boards or panels; as packaging or padding substances; as decorative acoustics; filtrative, or diffusive sheets; as clothing or fabric interlayers; as interlocking fastening devices; as damp course and surfacing membranes, for concrete or plaster products; as brushes or mats. The fibrillated sheet may be shaved to form a tufted perforated sheet. Combinations or pairs of products may structurally interlock or reinforce each other.

Cuspated sheets may be pierced by shaving the cusps, then threaded on multiple cords or wires to form space frames or filter sets capable of dismantling for cleaning. Products from our process using suitable synthetic rubbers are of particular use as flexible foam-like layers for use for example in clothing, upholstery, mural linings, insulation and carpet underlay. The finished products may be reworked by partial fusion, zonal heat sealing, or adhesion over specific areas. Selected zones of the original film may remain unworked. Cuspated films may be slit into strips and woven by looms, knitted, braided, or other methods known in the art to produce textile like forms. Doubly corrugated products may give pseudo-stretch in one or two dimensions to relatively inextensible plastics.

'Doubly cuspated' sheet or 'singly cuspated' sheet may serve as a matrix for insertion, into the cusps, of close fitting rods of a rigid substance. Stratified structures may be constructed from 'doubly cusped' sheets by insertion of arrays of rods in opposing cusps. If such rods are more than twice cusp length the cuspated sheets will be held separated in space. A stack of such sheets will accept heavy loadings, all forces being transformed into thrust of the rods in the cusps. Increase in load beyond a point characteristic of the system will initiate cold draw in the cusps, and under favourable conditions draw will continue until the capability for molecular orientation is exhausted. Since cold draw consumes much work per cusp, the simultaneous draw of large numbers of cusps over large areas will consume surprising energies and such products are of use in buffers and safety mats.

Cuspated sheets made from certain classes of rubbers such as the Cariflex of Krayton range of Shell Chemicals Ltd and the Solprene range by Philips Chemicals have special properties. Such rubbers allow complex and extremely "bulky" cuspated sheet to be made continuously at high rate. Elastomeric cuspated sheet has excellent cushioning properties yet is far stronger in tension than fine-celled elastomeric foams and will resist abrasive conditions which would reduce sponge-rubbers to crumb, and may be used as furniture components.

The cuspated sheets of our invention because of their tapering columnar structure are well designed to withstand compressive forces normal to its plane. Because the structure is extremely anisotropic the crush strength across the sheet is correspondingly low. Furthermore in a deep drawn 'doubly cuspate' sheet the contour of the material passes so steeply from up-cusp to down-cusp that sidewise compression causes relatively slight flexure. All these considerations indicate that even in hard and rigid materials springy and elastic behaviour will be found under conditions of crosswise compression; that is, compression at right angles to the cusp axis. Zigzag corrugated cuspated sheet acts like a planar spring, and deeply cuspated sheet of any design is springy under cross compression. These facts imply that there are cushioning and crush resistance applications which can be based on the sidewise properties of cuspated sheet. We have found that by bonding a series of sheets with separating membranes into a slab, a material is produced which when dissected at right angles to its component layers makes excellent cushioning and upholstery material.

Cuspated sheet may be viewed as a preparatory or intermediate product. Either as an in-line process or by means of a reheating stage, the cuspated sheet may be regarded as a basis either for blowing or fibre drawing. Each cusp especially if "blobby" is in effect a parison so that by remelting all or some of the cusps can be blown, either free into a mould or as a group to form a fused cellular slab. Similarly each cusp if remelted may form the source for melt spinning fibres. The cuspated sheet, when cool may by further closure of its mould be orientated or cold drawn.

The cuspated sheets are of particular value when used as core sheets for laminates.

Accordingly in a further aspect of our invention we provide a laminate comprising a facing sheet bonded to one face of a non-apertured cuspated core sheet which core sheet, before bonding, having two faces each comprising an array of tips of hollow projections wherein the part of the core sheet inter-connecting the tips of the projections has a substantially minimum surface area and wherein the tip of each projection is thicker than the parts of the sheet connecting the tips.

The laminates of our invention may have more than two layers and comprise alternating layers of facing and cuspated sheet. Preferably the facing sheet should be capable of contacting substantially all the tips of the projections on the face of the cuspated sheet to which it is to be bonded. If the facing sheet of material is flexible the sheet may be deformed to contact the tips of the projection but in the case of inflexible sheets the surface of the facing sheet of material is preferably accurately shaped to the surface bounded by the tips of the projections on one face of the cuspated sheet. The surface of the facing sheet may be either smooth, indented or otherwise textured. At a limit the texture of the facings may be so deep as substantially to match the shape of the face of the cuspated sheet.

The laminates of our invention have advantages over laminates of the same apparent density prepared from similar sheets of different configuration, in that firstly the resistance of the laminate to deformation is at an optimum and secondly the thicker tips are easier to bond to the facing sheet without deformation of the cuspated sheet.

The cuspated sheets used in our invention may be made by any suitable process known in the art. We prefer to use cuspated sheets made from material having good melt spinning properties and such cuspated sheets may be made by the process of our invention described hereinbefore.

The facing sheet may be made from any suitable material such as, for example, metal, glass, paper, wood, plaster, plastic or plastic coated paper.

The physical properties of the laminates of our invention depend in part upon the following factors:

1. The natures of the materials comprising the facing and cuspated sheets.
2. The thickness of the sheets.
3. The configuration of the cuspated sheet.
4. The type of bonding between the cuspated and facing sheet.
5. The amount, if any, of prestressing of the cuspated sheet before lamination.
6. The number of layers forming the laminate.

In the preferred embodiment of our invention the laminates are made from polyethylene or polypropylene and are bonded together by welding the thicker tips of the projections to the facing sheet. This preferred embodiment takes advantage of the tips of the projections being thicker than the rest of the cuspated sheet and therefore being easier to spot weld to the facing sheet.

In a preferred aspect of our invention the cuspated sheet is in the form of a bicorrugated sheet or zigzag corrugated sheet. This configuration renders the sheet particularly resistant to deformation. The resistance to deformation and the apparent density of the laminates of our invention may be increased by compressing the cuspated sheet prior to bonding to the facing sheet or sheets.

We have found that the laminates of our invention have the unexpected property of being extremely easy to shape by strip heat folding, and lend themselves to production of corner bends of very high strength.

Accordingly in a further aspect of our invention we provide a process of strip heat folding said process comprising heating a narrow strip across one face of a laminate according to our invention to a heat deformable stage and subsequently bending the laminate inwards along the heated strip.

It is well known in the art that solid sheets of rigid thermoplastic materials may be bent by softening a narrow straight zone by means of a shielded heater. In such a case the softened strip acts as a hinge, and if the folded sheet is held in position until it has cooled, accurate bends may be made. However, in such bending of sheet by strip heating very sharp bends, tending to zero radius, at the internal angle, are to be avoided because of the high stretch or compression necessary, with resulting thinning of deformation causing a weak bend. For these reasons the width of the heating zone in sheet strip-heat bending is normally at least twice sheet thickness.

We have now found that the laminates of our invention may be readily strip-heat folded to produce bends with substantially zero radius internal angles. Furthermore the mechanical strength of such bends is superior to that which might be produced in like material by any previously known means such as crush folding, mitreing and glueing or sealing; this bend of enhanced strength results from the fine structure developed on hot folding a laminate, of our invention, having a cuspated core. At the same time our operation is simple and fast, requiring neither the prior preparation of the laminate, nor the cutting of the sheet in any way.

Figure 11:
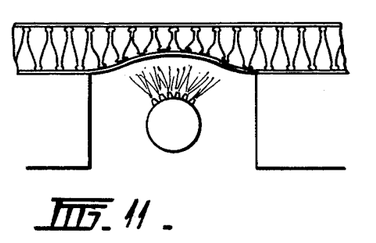
Figure 12:
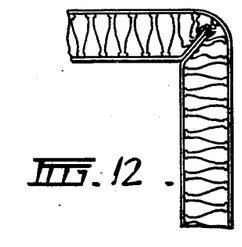

An example of this bending of a laminate of our invention is shown in FIGS. 11 and 12. A laminate of our invention is placed on a shielded strip heater as shown in FIG. 11. After a few seconds the heat softens the parts of the laminate adjacent to the heater and the tension in the laminate causes a hot notch to develop as shown in FIG. 11. The laminate is then removed and bent to produce a fold as shown for example in FIG. 12.

Such laminates may possess substantially zero internal radius, that is, the internal angle, may be crisp and sharp, defining for example the corner of a rectilinear box. The high structural efficiency of these bends is due to the fact that the molten or softened part of the heated face doubles in on itself and in many plastics forms a perfect fuse-weld, while at the same time this double thickness axial web is pressed together by and welded to the un-demoulded portions of the cusps. Under favourable conditions a bead or fillet of molten plastic may be extruded from the joint to reinforce the internal corner. Production of a sharp internal angle without fusing the external surface is possible because the cuspated structure can progressively demould, and opposed cusps or parts of cusps can by the fact of their original production by interdigitation pass between each other. Thus in effect the reduction of volume implied by making what appears to be a mitred corner is achieved without dissecting away any part of the laminate, while the material which has "disappeared" in fact has been reformed to reinforce the folded corner.

Figure 13:
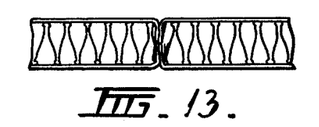
Figure 14:
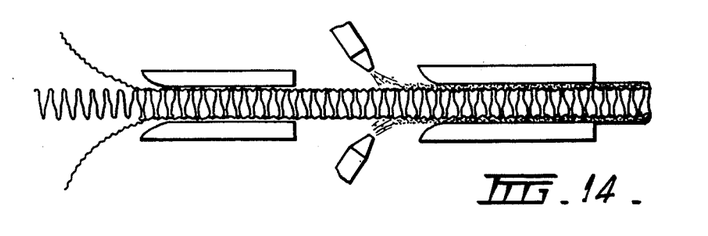

FIG. 13 shows a butt welded joint. If straight edges of laminates are radiantly heated softening of the facings near the edge coincides with edge demoulding of the core: two such edges pressed coplanar produce a strong 'tucked in' butt joint.

It is obvious that many variants on the above principles are possible, leading to means of edge sealing, demoulding and crushing of heated zones to produce hinge effects, etc., Where the face sheets are not self adhesive (as when for example polyolefin coated paper is used) suitable local use of hot melt adhesives may be employed.

The ability to fabricate strong corners and to butt weld sheets by similar means makes the fabrication of goods from these laminates relatively simple in terms of labour costs.

The laminates of our invention are of use, for example, as corrugated cardboard substitutes, and for textile, wall and floor covering, and as structural building panels.

Shaped articles which may be readily prepared from the laminates of our invention by strip heat folding include, for example, pallets, shaped conduits for pipes, walls of containers and furniture.

Laminates falling within the range of our invention may be prepared by interleaving without bonding a sheet of suitable material between a sheet of the same or different material and deforming all the sheets together by the method described hereinabove. We have found that when sheets of a synthetic rubber such as 'Krayton' or 'Solprene' are interleaved with facing sheets of a polyalkylene such as polyethylene that laminates are formed wherein the layers are bonded together only at the tips of the projections and wherein the facing sheets are substantially the same shape as the core sheet. Such laminates are of particular interest for textile, wall and floor covering applications.

The bonding of a thermoplastics core to facings of the same material may be performed, for example, in the following manner; a core was first moulded in polypropylene specifically from material 0.100 inch thick, a moulding 1 inch deep was produced off a square lattice design at 0.250 inch needle pitch.

To achieve lamination the two facing sheets were simultaneously raised to a temperature above their melting point, especially on the intermost surfaces intended to contact the cusps. Immediately antecedent to the heating of the face sheets the tips of the cusps were heated to a temperature of about 120°C or just below demoulding temperature. The faces and core were now placed together under light pressure, while heat was steadily supplied via the facing sheets. For the example cited, facing sheets were warmed over a period of 95 sec. by proximity of radiant heaters consuming 2 KW/sq.ft. and mounted 2 inches from the plastics.

Over the same 95 second period the cusps of the core were in direct contact with metal hotplates maintained at 130°C. Immediately after this preheating stage the facings and core are brought together under light clamp by silicone rubber belts facing hotplates at 190°C and held in clamp for a further 12 seconds before passing into a cooling region where a compressed air jet plays on both internal and external laminate surfaces. Such a laminate was found to be strongly bonded over its entire structure and to cool without loss of surface flatness. By variants of the heating and clamp cycles laminates of different weights, thicknesses and pitch were prepared from various plastics.

Laminates produced by these means were subjected to extensive physical testing and found to have exceptionally good properties. Such composites may usefully be compared with foam-sandwich stressed skin panels. It has already been stated that bulk density and material being equal, cuspated bulked shapings have superior compressive strength.

Cuspated core laminates are stronger in compression and shear than laminates based on foams. An important improvement in ruggedness results from other factors of scale. A plastics foam may have very small cells, up to 1 million per cubic inch for example. The individual cell walls or fibrils of such minute bubbles are flimsy in the extreme; such foams crumb when chafed and may be torn up with slight effort. Facings may readily be stripped once interfacial foam fracture has begun. However in our cuspated cores the effective cell size, that of the needle array pitch, is very coarse, 10 to 50 "cells" per cubic inch being typical. Although the overall bulk density of the cuspated core may match that of a fine celled foam, the coarse structure means that the individual fibrils are strong rods or tubules. The force necessary to dismantle core and facings in a cuspated-core laminate is typically more than 10 times that required to dismantle a foam-core panel of similar weight. For these reasons the cuspated core panel is uniquely suited to very rough duty applications as for example use in high impact components in vehicles, as pallets, parts of heavy crates and the like.

Laminates with additional external layers have the following specific advantages:

| Added External Plies | Special Use |
| --- | --- |
| Printed plastics film of same stock as face and core. | Decoration, advertising, etc.. |
| Papers coated with plastics of same stock as face and core. | Printability, enhanced strength, reduced cost. |
| Foils primed or precoated: sheet metal similarly prepared. | Hardness, flame resistance, sunlight and weather resistance. |

Cuspated core panels in general have much inferior thermal insulative properties than those in which foamed cores are used. However we have found it easy to trap fibrous insulants between cusps and panel faces during assembly.

Cuspated core panels have high bond strengths connecting face to face. We have found that such panels if edge sealed or if installed edge to edge are readily capable of withstanding hydraulic forces by filling these panels with portland cement or gypsum plaster slurries. Either one or both compartments between facing and neutral axis may be filled. Ligaments, electric conductors and pipes for services may be emplaced in such structures. Filling such panels with hydraulic cement adds mass, provides connective means, improves acoustical opacity and fire resistance.

The numerous strong fibrils or membranes connecting the facings through the medium of the core permits such panels to contain other forms of pressure than the hydraulic forces. If edges are sealed pneumatic pressures can be sustained. We have been able to sustain pressures of 20 psi within such panels made from polypropylene. If elastomers are used the panels are inflatable yet preserve a relatively flat surface.

Cuspated sheet may have cusps on one side only. If metal honeycomb or similar structure presenting a plurality of deep cavities is used as one mould part and an array of spikes is used as the other part, deeply 'singly cuspated' sheet resembling a series of bristles is obtained.

'Singly cuspated' sheet may be cast into concrete or plaster so that the spikes are deeply embedded and the flat surface remains external. The sheet may be left embedded or removed once the slab has hardened. The inverse cusp pattern is decorative and acts as an excellent acoustic surface.

'Singly cuspated' sheet made from rigid plastics materials can act as a 'gangnail' and be driven into soft sheet materials. If a plastics foam has such spiky sheet driven into one or both surfaces a foam sandwich composite of unexpected strength is created extremely simply without use of adhesives.

Any cuspated sheet may have some or all of the cusp tips removed. We have found that such sheet is useful as filter, percolation or ventilation media.

If cuspated sheet is placed in contact with a hotplate the cusps will fuse. We have found that if any porous sheet, such as a fabric, tissue, gauze or finely perforated sheet is placed between cusps and hotplate, and moderate pressure is applied as cusp fusion proceeds, the molten cusp will strike through the porous or fibrous layer, impregnating small circular areas with molten plastic. If the source of heat is now removed the porous or fibrous sheet will be strongly bonded to the cuspated sheet at a host of points. Such a strike-through facing may be applied to one or both sides of a doubly cusped sheet, or to one side of a singly cusped sheet.

We have found that strike through composites based on a strong double sided cuspated core with woven or non woven fabrics as both facings have a unique combination of properties. Such composites retain great suppleness and pliability: indeed if the fabrics are extensible, as for example if knitted fabrics are used the entire composite will readily deform to fit compound curves. However despite their suppleness the compressive strength of the laminate remains unabated. These composites thus combine suppleness with great constancy of thickness and load bearing ability. Lightweight and relatively cheap materials of this type can be employed as screens, lightweight building sheets, heavy tentage and as substance serving as padding or surface in upholstery.

If fabric or fibre faced composites are moistened with suitable hardenable fluids, such as for example thermosetting polyester or epoxy resins, cement slurries, casting polyurethanes, rubber latices, etc. with or without the addition of extra fibrous material, then reinforced sheet, panel or shapings with a structural cuspated sheet core are obtained. Because of the increased beam depth such objects in reinforced plastics have greatly enhanced specific stiffness. It is important to stress however that because of the quality of constant core thickness even when the sheet as a whole is deformed, open cored structures can frequently be produced without matched moulds by merely pressing the reinforced laminate against a single mould by rubber bag or vacuum bag, etc.. By such means large structurally efficient laminates can be produced as for example in design of boats, vehicle bodies, containers, tanks, large bore pipes, etc..

Where strike-through laminates are specifically to be faced with a metal fabric or porous sheet such as gauze or metal filigree then a special method of assembly may be employed. We have found that the metal fabric may be heated, for example, by open flame immediately before the act of assembly.

Figure 8:
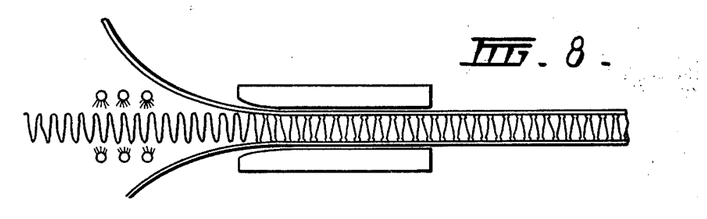
FIGS. 8 to 15: Laminate formation including welding and bending are shown.
Figure 9:
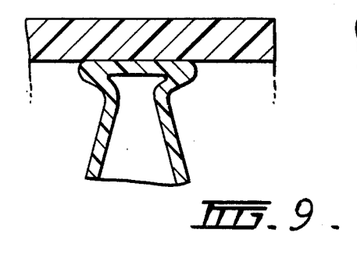
Figure 10:
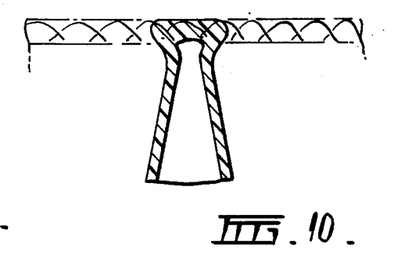

The production of strike-through laminates is shown in the accompanying diagrams. In FIG. 8 a previously made 'doubly cuspate' core sheet of a thermoplastic material is bring drawn continuously between heated plates while preheated surfacing sheets are applied under controlled pressure. Heat is also applied just before assembly by heaters located in the axis of the process. The facing sheets may be thermoplastics or thermoplastics coated sheet hot weldable to the core sheet: or the facing sheets may be fibrous or permeable. FIG. 9 shows a plastics to plastics cusp weld, FIG. 10 shows a fibrous sheet to cusp weld, the molten cusp tip effectively impregnating the fabric.

Figure 15:
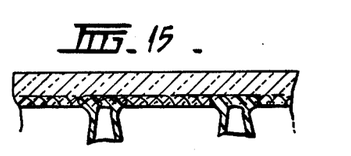

Fibrous faced or strike-through laminate may be further processed by impregnation of the fabric facing sheets with hardenable resin, optionally with addition of further fibrous layers. Cure or hardening of this resin produces a double walled reinforced plastics laminate with cuspated core. FIG. 15 shows a section of such laminate, cusps strike-through bonded and further fabric and resin added. FIG. 12 shows core, previously made or produced in line, first being fabric faced by strike-through then supplied with curing resin from nozzles and cured by plates.

In a still further aspect of our invention we provide apparatus for manufacturing cuspated sheet which apparatus comprises an array of cold projections, a second array of cold projections and a means of pressing against one fact of a hot sheet of material the first array of cold projections, and simultaneously pressing against the second face of the hot sheet of material the second array of cold projections so that the arrays interpenetrate in such a manner that the projections of the second array are spaced from the projections on the first array by a distance greater than the thickness of the sheet.

The arrays of projections may be made from any convenient materials. Preferably the projections are constructed of a material having a high thermal capacity so that the projections may be easily cooled during the interdigitation process. The points may be cooled either by conduction of heat away from the tip of the projections through the material forming the projection or the projection may be cooled by circulation of cold fluid either around the outside or through passages cut in the interior of the projection.

In an alternative embodiment of our invention the arrays or projections may be transitory. Thus for example the arrays of projections may be two arrays of objects projected simultaneously into the opposite sides of the hot sheet. Such objects may be solids such as for example ball bearings or pulses of cold fluid.

If the objects are fluid, the speed of projection must be sufficiently high for the pulses of fluid to have sufficient momentum to draw the sheet without the fluid pressure causing significant lateral stretch.

So that our invention may be clearly understood certain practical embodiments will now be described with reference to the diagrams, in which.

Figure 7:
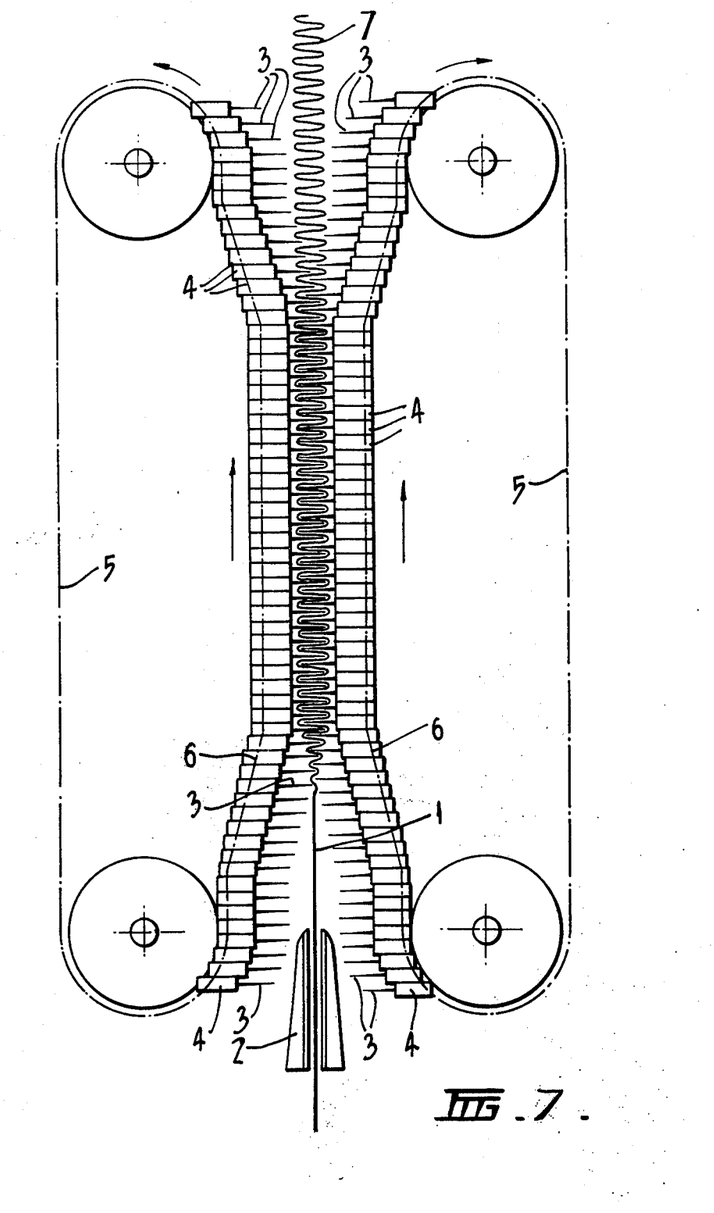
FIG. 7: shows a schematic view of an apparatus for continuous operation of our process.

Thermoplastic film 1 is extruded from the extruder die 2 and fed between the arrays of needles. The individual rows of needles 3 are mounted on combs 4 which are separately slideable in a direction at right angles to the plane of two cooperative belts or link-chain circuits 5 and the interdigitation of the combs is effected by camming 6 as is the withdrawal of the combs after the formed sheet 7 has cooled.

An essential principle of our process is that whereas a cold sharp needle will readily puncture a tensioned elastic membrane, or at least cause extreme thinning at the point of contact, such a cold needle or knife edge will, however sharp, not puncture a membrane of fluid melt, but will push the melt membrane ahead of its point, causing a typical cusp shaped 'draw'.

The resulting shape of the thermoplastics sheet after forming is in general that geometric form which represents the least surface area connecting the constraining arrays. Very high stretch ratios may be obtained, and products can be produced which are of far deeper 'draw' than could be obtained by previous thermoforming techniques. Tooling is relatively simple since shape-matching and overall surface contouring are not required. Cooling is for the same reason easy and efficient, since almost the entire area of the plastic and the forming tool alike remain accessible to convective cooling.

The general principles described here are susceptible to a wide range of variation. For example the surface which is the envelope of tips of the tool array need not be planar. The edges or pins need not follow paths at right angles to the sheet. These projections may follow curved or slanting paths or the individual projections may follow different paths. The two arrays may also for example during interpenetration be moved laterally with respect to one another. Two or more molten webs may be operated on in successive acts of interdigitation. Cuspated products may be combined or sealed to other membranes. The process may operate on a sheet at a time basis, continuously by remelting film or sheet, or continuously in line with sheet production by an extrusion step.

Where continuous in line manufacture takes place the process converts all of the material to its bulky form without trimming loss.

The speed of the press stroke and the initial temperature of the thermoplastic material are not narrowly critical.

In general satisfactory, i.e. unpunctured formed sheets will be obtained within the temperature region from the melting point or softening point of the thermoplastic material to the temperature at which the material becomes unworkable, i.e. either the boiling point or decomposition point, or the point at which the material will not form a stable film but the film will perforate, due to internal stresses. For most thermoplastic materials this range of working temperatures is over 50°C; however, for certain materials the range of operating temperatures is relatively limited. The speed of the press stroke should be such that the time taken for forming is insufficient for the sheet being formed to cool down over all its area below its melting or softening point but not so fast that the pins will move faster than the material being formed can flow and hence cause perforation. In general terms, the higher the initial temperature of the sheet the wider the range of operating speeds. The operational range in any particular case depends upon the design of the machine, whether the material is positively cooled or heated during forming, ambient conditions, the initial temperature, frequency, shape and material of construction of the pins and the thickness, chemical and physical nature of the sheet to be formed.

However the operating range may be found by routine experiment. Thus the minimum and maximum temperature of operation of the process for the sheet may be measured. If a temperature is chosen within this operating range and an arbitrary speed of press stroke is chosen and the resulting forming is punctured, and hence unsatisfactory, the operating region may be found by 1. if the forming is shallow punctured cusps the speed of the press stroke and/or the temperature is too low
2. if the forming is in the form of deep drawn cusps with thin perforated walls, then the speed of the press stroke is too high. Wall perforation may be reduced to some extent by dropping the temperature of the sheet. Example 27 illustrates the operating regions for particular materials using a particular machine.

It should be emphasized that for most melt spinnable thermoplastics, for example, polyolefins, PVC copolymers and glass, the range of operating conditions is wide and we have found that if the temperature is at least 20°C above the softening or melting point then speeds of press stroke in the range from 2.5 to 30 mm/sec will give satisfactory formings. For low density polyethylene 1–30, for Flovic (Registered Trade Mark for a PVC copolymer sheet) 2½–40 mm/sec are satisfactory ranges.

In general the shape of the forming obtained in our process depends upon the forming conditions, slow forming with sequential cooling of the sheet during forming will give a cusp approaching a cone shape whereas fast forming at high temperature with little cooling during forming will give a narrow spike like cusp. The exact conditions required for any particular shape may be found by experiment. The sequential cooling is caused, we believe, to some extent by the withdrawal of heat from the sheet through the cold pins causing the portions of the sheet nearest the pins to cool at a faster rate than the portions of the sheet away from the pins, but also the draw will initially occur in the hot area adjacent to the area cooled by the pins as the thrust in this area will be the greatest; the drawn material will cool faster than the undrawn area leading to sequential cooling.

Special effects may be obtained by modifying the natural cooling by either heating or cooling the sheet during the forming process or by insulating the material during the forming process.

During the process, after the molten material has been formed, the projections are maintained in the formed sheet by keeping the forming beds of needles in position until the material has cooled sufficiently for the thermoplastic to retain its formed shape at which stage the needles can be removed from the product. The needles may be allowed to cool under ambient conditions before reuse or alternatively the needles may be cooled in, e.g. a cold fluid bath before being used to form a further sheet of material.

The invention is now illustrated by, but by no means limited to, the following examples.

EXAMPLE 1

Figure 1:
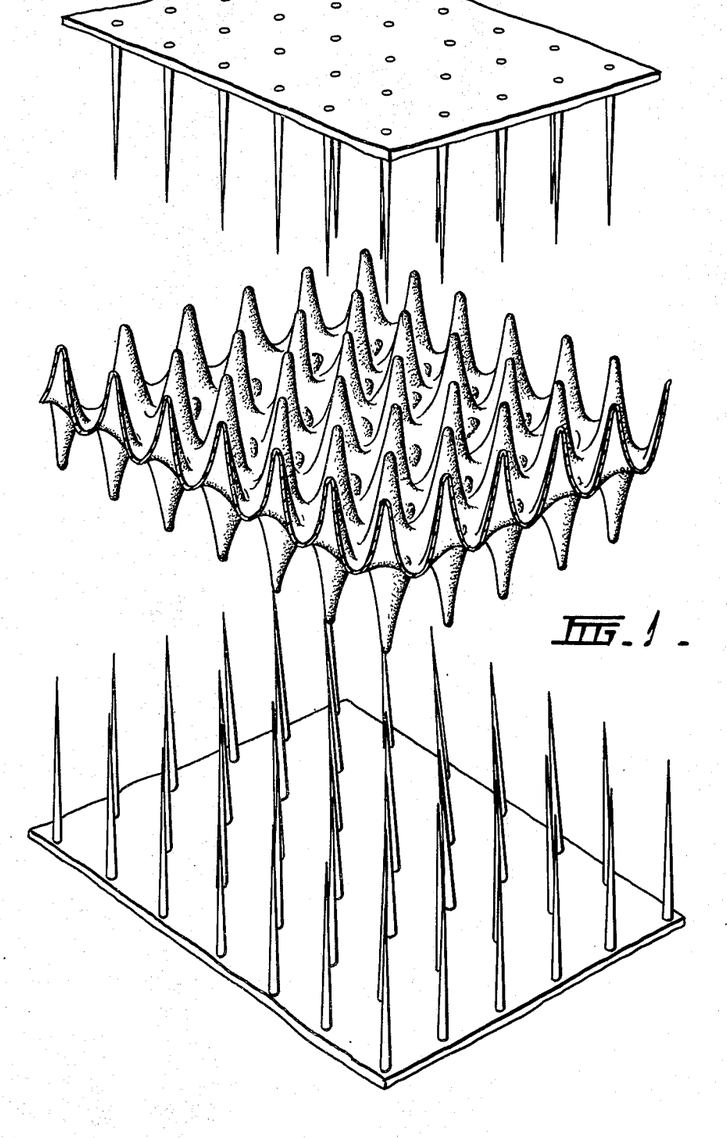
FIG. 1: shows small areas of two arrays of needles (A and B) which by advancing as shown by the arrows can interdigitate into a sheet of hot-melt, causing it to be formed into the countercuspate or 'doubly cuspate' form shown (C), in which the cusps are hollow fibrils. Despite the depth of draw the material at the tips of the fibrils is substantially as thick as the original sheet as shown by the section shown in FIG. 2. An alternative cuspated sheet is shown in FIGS. 3 and 4.
Figure 2:
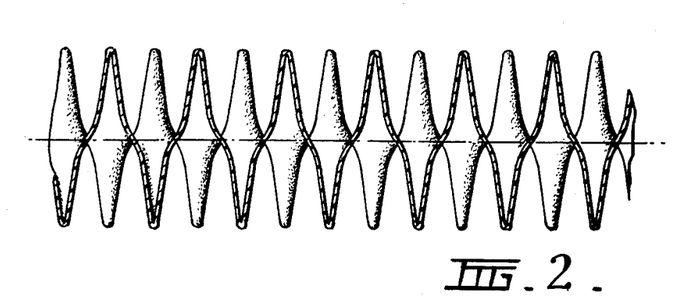
Figure 3:
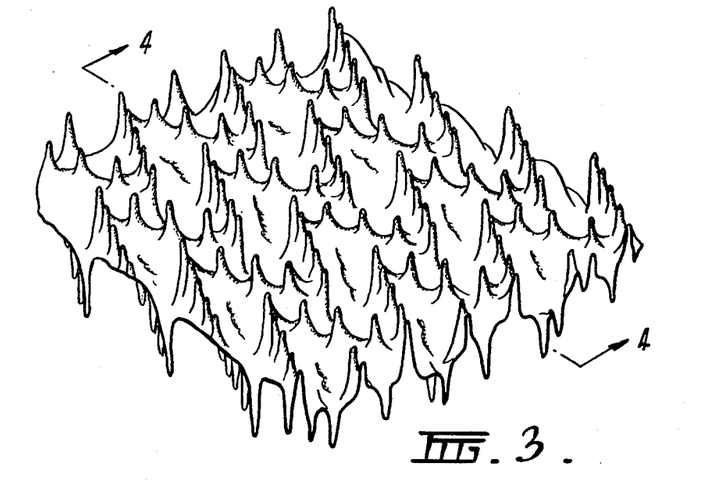
Figure 4:
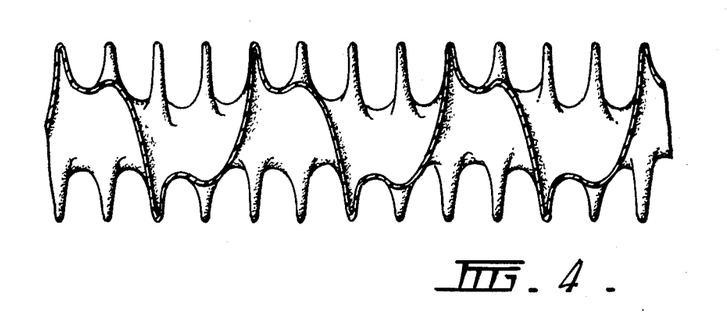

Two square arrays of sharp needles were mounted in a light handpress capable of bringing the parts together in register. The upper and lower arrays were offset so that any needle of the upper set would enter the centre of a square of four of the needles of the lower set; in effect the arrays were staggered to give uniform interdigitation (FIG. 1).

The "unit square" distance in each array was ½ inch and the free needle height 1 inch. Polyethylene film specimens, clamped in an open frame comprising hinged square annuli were fused to thermoforming temperature by being held in proximity with a radiant hotplate, and quickly placed between the jaws of the press.

The arrays at ambient temperature were allowed to interdigitate under low pressure. Countercuspate shapings were produced. It was found that polyethylene film ranging from thicknesses of 0.006 inch to 0.100 inch could be drawn to depths of 1 inch, giving increases in surface area up to 900%. The rate of draw giving best results required 1 to 2 seconds for a "mould" interpenetration of 1 inch. Under those conditions the resulting cuspated sheet specimens if carefully sectioned showed that maximum stretch had occurred in the mid region while the tips of the cusps remained relatively unthinned. Similar results were obtained using sheets of polypropylene.

EXAMPLE 2

The experiments of Example 1 were repeated using arrays of fine needles only 0.08 inch apart and 0.4 inch and fine structured cuspated sheet with a texture resembling coarse velvet was obtained.

EXAMPLE 3

The experiments of Example 1 were repeated using two arrays one of which comprised a triangular array of needles ¼ inch apart and free needle height ½ inch and the other array comprised a hexagonal sharp edged aluminium honeycomb of ¼ inch scale between the cell centres.

Figure 5:
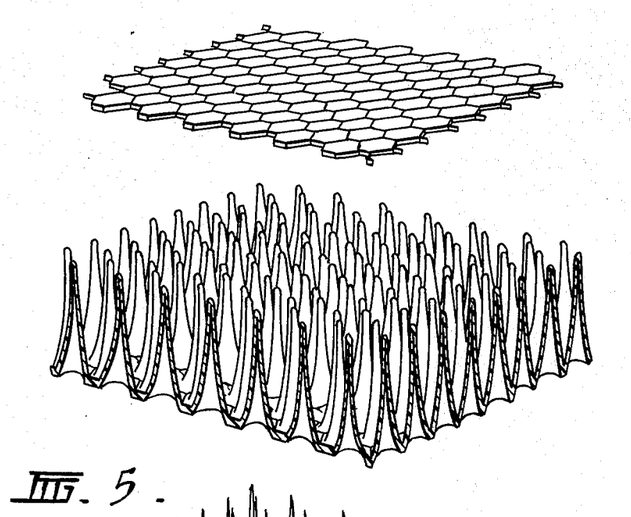
FIG. 5: shows an array of needles designed to invaginate in the cells of a sharp edged honeycomb, leading to the cuspate product shown in FIG. 6 in which the hollow fibrils are all to one side, yielding a 'singly cuspate' product.
Figure 6:
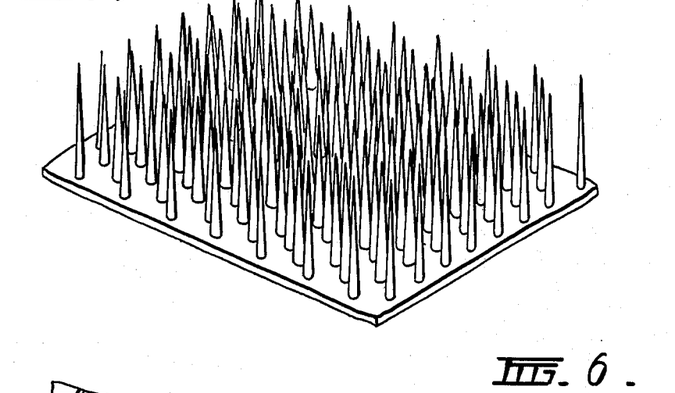

The triangular array of needles was mounted in a light hand press so that each needle entered the centre of hexagonal orifice of aluminium honeycomb (see FIG. 5).

Using specimens of polythene and polypropylene in the thickness range 0.100 inch to 0.600 inch cuspated products having hollow fibrils on one side only were produced.

EXAMPLE 4

The experiments of Example 1 were repeated using various different moulds, materials and depth of draw. The results are shown in Table 1:

TABLE I

| MATERIALS | THICKNESS INCHES | DEPTH OF DRAW INCHES | MOULD LATTICE | PITCH | COMMENTS |
| --- | --- | --- | --- | --- | --- |
| Low density polyethylene, High density polyethylene, Polypropylene, High impact polystyrene, Saran. | 0.012 | 1/8, 3/16, 1/4, 3/8. | Square doubly cusped | 0.060 | Fine grain product of good quality. |
| | 0.020 | 3/16, 1/4, 3/8, 1/2. | " | " | As above: products stronger. |
| | 0.040 | 1/4, 3/8, 1/2, 5/8. | " | " | Products of maximum weight for this mould. |
| Nylon 610 | 0.032 | 1/2, 3/4. | " | " | Gives very deep draw. |
| LD and HD Polyethylene H.I. Styrene Toffee | 0.040 | 1/2, 3/4, 1. | Hexagon single cusped | 0.125 | Brushlike unperforated. Moulds well. |
| Unplasticised PVC | 0.030 | 1/8 | " | 0.125 | Unsatisfactory; punctures |
| Plasticised PVC | 0.030 | 1/8 | " | | or fails to draw. |
| Polymethyl methacrylate | 0.18 | 1/8 | " | " | Will not draw |
| | 0.32 | 1/8 | " | | |
| All polyolefines, nylon 66, 610, 6, Toffee, Glass. | 0.060 0.090 0.125 0.200 0.240 | 1/4, 1.6 | Square doubly cusped | 0.250 | All excellent products. |
| P.V. Alcohol | 0.090 | 3/8 | " | " | Tends to puncture. |
| Low density polyethylene/ vinyl alcohol copolymer 80/20. | 0.060 0.100 0.150 | 3/8, 1.4 | " | " | Excellent medium: semi elastic. |
| 'Cariflex' 2104 | 0.010 | 1/8, 3/8, 1/2, | Various | | Adequate medium. |

TABLE I-continued

| MATERIALS | THICKNESS INCHES | DEPTH OF DRAW INCHES | MOULD LATTICE | PITCH | COMMENTS |
|---|---|---|---|---|---|
| 'Krayton' grades 'Solprene' grades Nylons, High impact styrene, Toffee, Cariflex 210, Low density polythene, High density polythene, Poly(4-methylpent-ene-1). | 0.150 0.040 0.060 0.090 0.120 0.180 0.240 | 3/4. 1/2, 3/4, 1, 1 1/2. | moulds Triangle bi-cusped | 1/2 | All mould well giving unperforated products. |
| Soda glass, Saran, Toffee, Low density and High density polythene, Polypropylene, H.I. polystyrene. | 0.020 0.040 0.060 | 1/4, 3/8. | Zigzag 1/2, 60 | Ridge to ridge 1/4" | Especially easy to mould, can be compressed and hot set. |
| Polyethylenes, "Krayton", Polyproplyene. | 0.150 0.220 | 1, 1 1/2, 2. | Zigzag 1" 45 | Ridge to ridge 1" | Large zigzag, good springy sheets. |
| Kraytons L.D. polyethylene H.I. polystyrene. | 0.125 0.180 | 2, 3. | Zigzag 2", 50° | Ridge to ridge 1 1/2" | Giant two way stretch. |
| H.I. Styrene, Polyethylenes, Polypropylene, Poly(4-methyl-pentene-1). | 0.125 0.250 | 6, 9. | Triangle single cusped | 2" | Extreme cusps. |
| A.B.S. | 0.125 | 1. | " | " | Barely draws. |
| Soda glass. | 0.125 | 10. | " | " | Decorative. |
| 'Krayton' polyethylene, low and high density. | 0.125 | 1/2, 5/8. | Parallel knife edges. | 1/4" | Corrugated with heavy edges. |
| Gelatine 15% water at 90°C | 0.070 | 1/2 | Square bicusp | 1/4" | Workable medium. |

EXAMPLE 5

Soda glass sheet 3/16 inch thick was carefully and slowly heated to 950°C then shaped at a rate of 1 inch/second in a mould comprising a double cuspate square array of steel needles with lattice pitch of ½ inch. The depth of draw was 2 inches. Cooling of the glass occurred swiftly by radiation and time in the mould was only 15 seconds. Excellent cuspated glass sheet was produced.

The cuspated glass sheet was substantially stress free and did not require annealing. The experiment was repeated using the following materials:

| Material | Thickness |
|---|---|
| Soda Glass | 0.250" |
| Soda Glass | 0.125" |
| Soda Glass (Red) | 0.100" |
| Soda Glass (Anti-glare Grey) | 0.170" |
| Borosilicate Glass | 0.085" |

-continued

| Material | Thickness |
|---|---|
| Borosilicate Glass | 0.125" |

In each case unperforated cuspated sheet was prepared of excellent quality.

EXAMPLE 6

This example demonstrates the effect of change of the ratio of depth of draw to unit square distance on compressive yield strength of the cuspated sheet.

Cuspated sheets were prepared by the method of Example 1 except that the unit square distance was ¼ inch. Sheets of material of different thickness and nature were drawn to varying depths as shown in Table 2. The compressive yield strength of the resultant cuspated sheets was measured by ASTM Method D1621-64.

TABLE 2

| MATERIAL | THICKNESS (INCHES) | BULK DENSITY (16/ft³) | DEPTH OF DRAW (INCHES) | RATIO OF DEPTH/DRAW UNIT SQUARE DISTANCE | COMPRESSIVE YIELD STRENGTH (psi) |
|---|---|---|---|---|---|
| Low density polythene | 0.010 | 1.5 | 0.31 | 1.2 | 3.3 |
| | 0.018 | 1.5 | 0.6 | 2.4 | 4.5 |
| | 0.036 | 1.5 | 1.0 | 4.0 | 2.0 |
| | 0.010 | 2.0 | 0.25 | 1.0 | 5.0 |
| | 0.018 | 2.0 | 0.5 | 2.0 | 9.5 |
| | 0.036 | 2.0 | 0.75 | 3.0 | 5.4 |
| | 0.018 | 3.0 | 0.33 | 1.3 | 14 |
| | 0.036 | 3.0 | 0.55 | 2.2 | 21 |
| | 0.063 | 3.0 | 0.85 | 1.4 | 8.4 |
| | 0.018 | 4.0 | 0.25 | 1.0 | 17 |
| | 0.036 | 4.0 | 0.5 | 2.0 | 35 |
| | 0.063 | 4.0 | 0.75 | 3.0 | 24 |
| High impact polystyrene | 0.010 | 2.0 | 0.3 | 1.2 | 23 |
| | 0.020 | 2.0 | 0.6 | 2.4 | 50 |
| | 0.040 | 2.0 | 1.2 | 4.8 | 12 |
| | 0.010 | 2.5 | 0.24 | 0.9 | 32 |
| | 0.020 | 2.5 | 0.47 | 1.9 | 84 |
| | 0.040 | 2.5 | 0.95 | 3.8 | 40 |
| | 0.020 | 4.0 | 0.27 | 1.1 | 125 |
| | 0.040 | 4.0 | 0.6 | 2.4 | 170 |
| | 0.063 | 4.0 | 1.0 | 4.0 | 62 |

EXAMPLE 7

One principal purpose of the present concept is to "bulk" flat sheet materials by importing stretch in a repeat pattern. For example one may increase the surface area of the original sheet by a factor of 10 while the volume which is an envelope to the cuspated shaping may be 50 times the volume of the original flat sheet. From these considerations it follows that any factor which limits draw or stretch likewise delineates the efficiency of the bulking operation. The following experiments well illustrate this by showing that sharpness of the forming spikes is important in shaping sheet from the point of view of "bulking" efficiency.

A mould was prepared as follows. The die-set consisted of two identical flat sheets of aluminium ½ inch thick, measuring 9 × 12 inches in plan. On each, a point lattice was marked off and drilled through at each point. Each hole was 0.092 inch diameter, and the spacing of the holes was 0.250 inch apart. Metal rods 2 inches long were driven into the holes forming a vertical array of rods of equal height and evenly spaced. In out first experiment the rods were flat ended. The two mould parts were mounted in a hand press so that each pin of the upper part would on closing the press pass centrally between four opposing pins. The press stroke was set to allow a depth of draw of 1 inch.

It was found that when a sheet of low density polyethylene 0.067 inch thick was held in a frame and melted by radiant heat, it could be quickly placed between the mould faces and the press closed. The metal parts of the mould were at 25°C in these experiments.

When flat ended pins were used some 35% of the original sheet area was chilled by contact with the cold steel, and solidified without significant draw. A further 30% of sheet area approximately formed "blobs" peripheral to the actual areas of contact. For these reasons less than half of the sheet used remained available for stretch as the mould parts interdigitated, and the parts which were stretched became very thin compared with the chilled discs due to freezing on the flat pins. For these reasons the efficiency of bulking did not permit stretch of more than about ⅓ of the sheet area.

The pins were tapered to flat ends of half the original pin diameter, that is, to a new end diameter of 0.046 inch. Under these conditions some ⅔ of the sheet area became available for operation.

Finally the pins were tapered right off to needle points. The entire area of sheet became available for draws.

From these experiments we noted:

| NEEDLE AREA | FRACTION OF AREA LOST TO SHAPING | BULKINESS OF PRODUCT |
| --- | --- | --- |
| 0.092. Pins entirely flat ended. | 2/3 | Shallow draw, poor thickness uniformity. |
| 0.046. Pins tapered but still very blunt. | 1/3 | Improved but still with plateaus of sheet. |
| Pins needle sharp. | Nil | Deep draw better stretch. |

A second factor influencing the efficiency of bulking is the amount of local cooling where the spike contacts the molten sheet. Using a mould with needle-sharp spikes as defined in Example 1 we studied the effect of mould temperature on product cross section. In all cases the press was closed at ½ inch per second, the low density polyethylene was at 180°C and was 0.067 inch thick.

We found the effect of variations in mould temperature shown below:

| MOULD TEMPERATURE | THICKEST PART OF CHILLED "BLOB" | GENERAL STRETCH UNIFORMITY |
| --- | --- | --- |
| 25°C | Rather "blobby" 0.050 | Too much chilled slug. |
| 55°C | 0.020 | Excellent: material not lost in blob at cusp has been added to neutral axis. |
| 85°C | Too thin 0.008" | Nearly punctured. Now too much material at neutral axis. |
| 95°C | Punctures | Unsatisfactory. |

A third factor influencing stretch distribution is the rate of draw. We found that for each medium there was a maximum rate at which the needles could be made to interdigitate without tearing or puncturing the material. Likewise for each medium there was an optimum rate of draws to obtain some pre-agreed pattern of stretch distribution. Generally the optimum lay at from 50 to 100 percent slower than the maximum rate. We found some typical figures as follows, all materials being 0.150 inch thick.

| MATERIAL | MAXIMUM RATE OF INTERDIGITATION | MOULD |
| --- | --- | --- |
| Low density polyethylene. | 1"/sec | Standard sharp mould of Example I. |
| High density polyethylene. | 1 1/2"/sec | |
| High Impact Styrene | 10"/sec | |
| Soda Glass | 15"/sec | |
| Toffee (B.P.210°C) | 4"/sec | |
| Nylon 66 | 80"/sec | |

EXAMPLE 8

Steel rods 50 mm long 1 mm diameter were mounted in holes drilled in 12 mm plywood, the holes being at 10 mm centres on a square pattern. Two such arrays were mounted so as to interdigitate to a depth of 30 mm. In first experiment the rods were flat ended cylinders at 15°C. In the second experiment the rods were made needle sharp and tapered at a 30° angle, yet still held at 15°C. In the third experiment the rods were sharp as in the second experiment, but held at 65°C. In each case a molten membrane of low density polyethylene held in a frame, was heated to 200°C and formed by interdigitation, the moulding act requiring 1 second.

CASE 1

More than 40% of the sheet area, and some 35% of the sheet weight, formed disc shaped chilled slugs, being rendered unavailable for draw, and interfering with clearances during the drawing cycle.

CASE 2

Because of reduced area contact and reduced projection material in the contact area, material trapped in the chilled slug regions now amounted to only 15% by sheet area and a similar amount by weight. A deeper draw product of better compressive strength was obtained.

CASE 3

Cold slug now formed only 7% of the sheet weight and a forming of still deeper draw, with very uniform materials distribution was obtained.

EXAMPLE 9

This example demonstrates the case of cuspated sheets as safety mats.

In a set of six 12 × 12 inch sheets of low density polyethylene 1 inch draw 0.250 pitch made from 0.150 inch sheet, 3 inch aluminium rods between opposing cusps were inserted producing a volume of stratified composite of about 1 cu.ft. The upper and lower arrays of pins were affixed in flat sheets of timber. We found that over 60,000 ft. lbs. was required to cold draw fully this construction.

EXAMPLE 10

A 'doubly cuspated' moulding 1 inch deep drawn from 0.125 inch polypropylene on the sharp mould of Example 1 was placed between sheets of release paper in a hot platen press under light pressure, the platens being at 200°C. Within 20 seconds the cusps began to melt and in a further 10 seconds the moulding was removed. Thickness was now ¾inch and the cusps had formed flat bases. On cooling the restructured forming was found to have retained its pliability and its compressive strength had approximately doubled because the shortened and flat based cusps resisted sidewise collapse under shear loads.

EXAMPLE 11

A zigazg corrugated cuspated shaping made from 0.040 inch polypropylene to a depth of ½ inch was compressed until packed tight, then clamped and dipped in boiling water for 50 seconds. The compressed shaping was cooled, unclamped and found to be hotset.

EXAMPLE 12

Laminates were prepared by the following general method using the cuspated sheets prepared in Examples 1 to 3.

A cuspated sheet was placed on top of a facing sheet and the two sheets were placed with the facing sheet in contact with a hot surface. The hot surface softened the facing sheet and a seal was formed between the cuspated sheet and the facing sheet by light pressure. The laminate was removed and allowed to cool. The laminates were either faced on one side only or alternatively faced on both sides by repeating the operation on the opposite face.

The laminates prepared are as shown in Table 3.

TABLE 3

| CORE SHEET | | | | No. of faces of core sheet faced |
|---|---|---|---|---|
| Material | Thickness | Ex. No. of Core Sheet | Facing Sheet | |
| Polythene | 0.01 | 1 | Polythene lined paper 0.01" | 1 |
|  | 0.01 | 1 | Polythene lined paper 0.01" | 2 |
| Polypropylene | 0.01 | 2 | Polypropylene 0.01" | 2 |
|  | 0.01 | 1 | Polypropylene 0.01" | 2 |
| 'Krayton' | 0.1 | 3 | Polythene 0.01" | 2 |

TABLE 3-continued

| CORE SHEET | | | | No. of faces of core sheet faced |
|---|---|---|---|---|
| Material | Thickness | Ex. No. of Core Sheet | Facing Sheet | |
| 'Solprene' | 0.1 | 2 | Polythene 0.1" | 1 |

EXAMPLE 13

The general method of preparing laminates described in Example 12 was repeated except that the core sheet was laterally compressed during the sealing operation. Laminates were prepared having greater rigidity and highter apparent bulk density.

EXAMPLE 14

A sheet of 'Krayton' 0.1 inch thick was placed between two sheets of polyethylene 0.01 inch thick and the sheets were clamped together and then formed by the process of Example 3 the product obtained was a trilaminate comprising a core of 'Krayton' bonded on each face at the tip of each projection to a sheet of polyethylene where the sheet of polythene has been deep drawn to substantially the same form as the 'Krayton' core sheet.

EXAMPLE 15

Cuspated soda glass sheet produced as in Example 5 was bonded to black 3/16 inch soda glass sheet on one face, to clear 3/16 inch soda glass sheet on the other face, filled epoxy resin sparingly applied to the cusps being the adhesive. The panel so made was tape-sealed at all edges to exclude dust. This panel was tested and found to possess stiffness, shear strength and compressive strength fitting it for use as a structural member in buildings. Samples were also made using transparent clear glass.

EXAMPLE 16

The cuspated core of clear soda glass of Example 5 was mirrored chemically before glueing into panel form as in EXAMPLE 15. A wall panel of enhanced thermal insulation and decorative appeal was obtained.

EXAMPLE 17

The panel of Example 16 was edge sealed by epoxy bonded closing strips and the air within exhausted by means of spigot and valve. The resulting panel with silvered cuspated core had a K factor of 0.09, and was of use as a thermal insulant.

EXAMPLE 18

The glass core of Example 5 was cusp-flattened after the manner of the plastics example in Example 10 by carefully heating the cusps and pressing between steel plates lubricated with graphite. The product had increased strength and visual appeal.

EXAMPLE 19

To construct a large shallow cylindrical composite, one free end of a doubly cuspate laminate strip 6 inches wide, 14 feet long was fixed to a simple rotatable mandrel in the form of a drum 12 inches diameter. Set up also adjacent to the mandrel was a strip of 30 mesh to the inch copper gauze 6 inches wide, 14 feet long, capable of being fed through a strip-flame able to raise the gauze to red heat by passage through the flame at a rate of 5 feet/minute. Rotation of the mandrel caused cuspated core and foil both to wind up under low tension. We employed a 1 inch deep ¼ inch pitch polypropylene double cusped core drawn from 0.100 inch sheet. On winding this system, the red hot gauze, weighing about ¼lb. sq. ft. first of all fused any cusps with which it came in contact, but at once its limited heat content became dissipated and the system cooled as a concentric laminate in which further plies were steadily added until the materials were fully wound on the mandrel as a four layer cylindrical "swiss roll" composite.

By like means small tags of gauze held in pliers may be flame heated and used as rapid bonding means for subassemblies of cuspated core materials rigid or elastomeric.

EXAMPLE 21

Two samples of the laminate as used in Example 20 were heated along one edge by means of a shielded radiant heater. The hot edges were pushed together and allowed to cool. A strong butt weld between the two samples of laminate was obtained.

EXAMPLE 22

"Strikethrough" laminates were prepared by placing fibrous sheet on cuspated core, pressing a hotplate against it for long enough to melt and flatten the tips of the cusps so that molten plastics impregnated the areas of contact and cooling the assembly until the bond had hardened. A wide range of cores was bonded to fibrous or porous sheets as shown in Table 4. The cuspated core was made by the method of Example 1.

TABLE 4

| CORE | FACING(S) | COMMENT |
| --- | --- | --- |
| Mould<br><br>Bicuspate, square lattice, 0.060 pitch<br><br>Depth of draw<br>1/8 ", 1/4 ", 3/8 "<br>Material<br>Low density polyethylene<br>High density polyethylene<br>Polypropylene<br>All .040" thick. | Each variant was faced with 200 mesh stainless steel gauze; 60 mesh polyester fibre silk screen cloth; 1.oz. glass fibre tissue; on both sides. | These composites were strongly bonded without puncturing the cuspated core. |
| Mould<br>Singly cuspate hexagonal lattice, 1/4 " pitch.<br><br>Depth of draw<br>1/2 ", 3/4 ", 1"<br>Material<br>Polypropylene,<br>High impact styrene,<br>Each 0.150" thick. | Each variant faced on cusped side with:<br>0.020 bronze mesh;<br>Fine weave linen;<br>Fine warp knit fabric;<br>10 mesh glass fibre scrim. | Composites of reduced pliability. |
| Mould<br><br>Bicuspate square lattice, 1/4 " pitch.<br><br>Depth of draw<br>1/2 ", 3/4 ", 1"<br>Material<br>Polypropylene,<br>Low density polyethylene,<br>All drawn from sheet 0.150" thick. | Each variant faced with:<br>Medium weight glass fibre cloth;<br>Polyester fibre light duck;<br>50 mesh wire gauze;<br>Coarse nylon knit material. | Composites pliable and of easy handle in polyethylene and knit fabric, stiff and leathery in polypropylene and straight weave fabrics. |

EXAMPLE 20

A laminate 20 mm thick faced on both sides with polyethylene sheet 1 mm thick, and having a polyethylene core based on sheets 3 mm thick, cuspated on matching square pattern arrays of needles at 8 mm spacing, was heated on the lower face only, along a straight zone 24 mm wide by means of a shielded radiant heater. The entire heating cycle occupied 20 seconds and the surface near the heater first of all fused, followed by progressive demoulding of the cusps welded to that surface. Upward shrinkage of the lower parts of the cusps produced an indrawn "hot notch" and the laminate was now lifted from the heater and bent to 90° using the unheated parts as wings of the hinge.

On cooling the bent laminate was found to be strong and resistant to deformation.

The strikethrough laminates prepared above can be used as cores for rigid laminates. Strikethrough laminates having a core formed from a mould having a bicuspate, square lattice, ¼ inch pitch from polypropylene 0.100 inch thick and drawn to a depth of ¾ inch laminated to glass fibre cloth were bonded with adhesives to plywood, hardboard, window glass, cast acrylic sheet and sheet steel. In each case a strong bond was obtained between the core and the facing sheet.

EXAMPLE 23

Samples of all the composites (except those faced with metal fabric) shown in the strikethrough laminates listed in Table 4 were wetted with a liquid thermosetting polyester resin catalysed to cure at room temperature. In each case the fabric layer became a hard skin. In addition samples of all the composites faced with fibreglass tissue or fibreglass woven fabric in Table 4 were wetted with fluid epoxy resin suitably catalysed, and two additional layers of woven glass fibre fabric were added then impregnated with the same epoxy resin. The composites were clamped between polished plates faced with cellophane and cured for 1 hour in an oven at 70°C. In each case strong panels were obtained, comprising two glass reinforced plastics sheets bonded to and spaced by the flattened cuspated strikethrough core.

Finally a sample of the polypropylene 1 inch biscuspate core faced on both sides with knitted nylon (the last example in Table 4) was wetted with polyester resin, sprayed with fibreglass rovings to the weight of 8 oz. sq. yd. and wetted out with further resin. This sample was constrained against the spherical surface of a large porcelain crucible, and cured, as a strong laminate of compound curvature.

EXAMPLE 24

Fused laminates were made up using the general method cited in Example 12, as shown in Table 5 below.

TABLE 5

| CORE | FACING(S) | COMMENT |
|---|---|---|
| Mould<br>Zigzag design ridge to ridge distance 5/8"<br>Material<br>Polypropylene 0.20"<br>Depth of draw<br>3/4", 1", 1 1/2" | Each variant faced with:<br>Polypropylene<br>0.100"<br>0.150"<br>0.200" | Heavy duty panel intended for use as pallets, crate and general purpose "board". |
| Mould and Material<br>As above.<br>Depth of draw<br>1" | As above with primed 0.006" aluminium foil. | As above; resistant to sunlight and flame. |
| Mould and Material<br>As above.<br>Depth of draw<br>1" | As above, using glass fibre scrim instead of foil as reinforcement. | Extreme heavy duty use. |
| Mould<br>Bicuspate, square design, 3/8 pitch.<br>Material<br>Polypropylene 0.200"<br>Depth of draw<br>1 1/2", 2". | Each variant faced with:<br>Polypropylene, 0.200" both sides. | Container and caravan wall, building sheet. |
| Mould<br>As above<br>Material<br>Low density polyethylene 0.100"<br>Depth of draw<br>3/4", 1" | Each variant faced with same stock as core. | Impact resistant board for automotive padding and crush packaging. |
| Mould<br>Bicuspate square design 0.2" pitch.<br>Material<br>Polypropylene<br>0.25", 0.40", 0.60"<br>Material<br>Polyethylene<br>0.40", 0.60", 0.100"<br>Depth of draw<br>1/4", 1/2", 3/4" | Each variant faced with same material as cores.<br>0.40", 0.60", 0.80" thick. | Various light to medium packaging boards, the low density boards "tough" the polypropylene ones very rigid. |
| Mould<br>As above.<br>Material<br>'Krayton' rubber 0.100" thick.<br>Depth of draw<br>1/2" | Faced on one side with 'Krayton' 0.80" thick. | Carpet underlay, cushioning sheet. |
| Mould<br>Zigzag design ridge to ridge distance 2".<br>Material<br>Low density polyethylene.<br>0.080", 0.120"<br>Depth of draw<br>4" | Faced both sides with L.D. Polythene 0.040" thick. | Extremely bulky low density packaging material of high crush qualities. |
| As above in Krayton 0.125" | Faced both sides with Krayton 0.060" thick. | Inflatable when edges sealed by fabrication. |
| Mould<br>Square design 1/4" pitch bicuspate.<br>Material<br>Low density polyethylene 0.060"<br>Depth of draw<br>3/4" | Faced both sides with polyethylene coated Kraft paper.<br>Paper 0.020"<br>Film 0.002" | Cheap stiff composite either printable or preprinted. |

All of the above were folded and butt welded by the methods of Example 20 to make up sample pallets, boxes, and "folded plate" panels.

EXAMPLE 25

Laminates were produced by making up strongly-spiked singly cuspate sheets and "nailing" them onto lightweight cores, the spiky cusps serving as a "gang-nail". By this means stressed-skin sandwich composites faced both sides were made by methods requiring neither adhesives nor drying times. The varieties prepared are shown in Table 6.

TABLE 6

| CUSPATED FACE | CORE |
|---|---|
| High impact polystyrene 0.200" thick drawn to 1" depth on 3/8" pitch, singly cuspate, hexagonal lattice. | Polystyrene foam 2" or polyurethane foam 2". Both rigid 2lbs/in.ft. Polyurethane foam 4" (Flexible). |
| Polypropylene 0.100" drawn to 1/2" on 1/8" pitch, hexagonal lattice. | Polystyrene foam sheet 1" thick, 1 1/2 lbs cu.ft. density. |
| As above | Cellular concrete 8 lbs/cu.ft. density. |

EXAMPLE 26

Cuspated core, and more especially cuspated core laminate, provides a repeating pattern of hollow cusps or tubules offering fixing points.

A panel comprising two sheets 0.100 inch polypropylene fused to a doubly cuspated core (square lattice 0.250 pitch) was made up. A studded or "riveted" appearance on the faces showed where cusps had fused to the faces. By drilling between any four "studs" and inserting an appropriate selftapping screw a thread was moulded inside the cusp opposite. Such fixtures could be unscrewed and replaced. A pull-out strength of 150 lbs was determined for the example given.

EXAMPLE 27

This example illustrates the measurement of the operating regions for drawing certain materials on a given machine.

Two square arrays of sharp needles were prepared as in Example 1 except that the free needle height was 2½inches. The method of Example 1 was used to draw sheets of 0.018 inch and 0.036 inch thickness black low desnity polyethylene and 0.010 inch. "Flovic". ("Flovic" is a Registered Trade Mark for a PVC copolymer sheet).

The sample sheets were clamped in a frame and heated over a hot plate as in Example 1. The temperature of the sheets were determined by use of an I.R. Pyrometer and the arrays of pins were pressed together at uniform speed. The total interpenetration of the pins was in each case 2 inches (i.e. depth of draw 1 inch). The arrays of pins were at ambient temperature. The results are given in the following table.

| Material | Initial Temperature °C | Draw time in seconds | Remarks |
|---|---|---|---|
| 0.010" "Flovic" white | 122 | 5 | cusps punctured |
| | 120 | 3 | cusps punctured |
| | 120 | 1 | satisfactory |
| | 122 | 4 | satisfactory |
| | 124 | 5 | satisfactory |
| | 124 | 6 | cusps punctured |
| | 129 | 6 | cusps punctured |
| | 140 | 6 | cusps punctured |
| | 140 | 5 | satisfactory |
| | 122 | 3 | satisfactory |
| | 124 | 3 | satisfactory |

-continued

| Material | Initial Temperature °C | Draw time in seconds | Remarks |
|---|---|---|---|
| | 129 | 3 | satisfactory |
| | 140 | 3 | satisfactory |
| | 122 | 0.5 | walls perforated |
| | 122 | 1.0 | satisfactory |
| | 124 | 1 | walls perforated |
| | 124 | 2 | satisfactory |
| | 129 | 1 | walls perforated |
| | 129 | 1.5 | satisfactory |
| | 140 | 1 | walls perforated |
| | 140 | 2.0 | satisfactory |
| | 145 | — | material smoked indicating decomposition |
| 0.018" LDPE black | 125 | 20 | cusps punctured |
| | 133 | 20 | satisfactory |
| | 133 | 23 | cusps punctured |
| | 125 | 19 | satisfactory |
| | 127 | 20 | cusps punctured |
| | 127 | 19 | satisfactory |
| | 125 | 10 | satisfactory |
| | 133 | 10 | satisfactory |
| | 125 | 1.5 | walls perforated |
| | 125 | 2 | satisfactory |
| | 127 | 1.5 | walls perforated |
| | 127 | 2 | satisfactory |
| | 133 | 1.5 | walls perforated |
| | 133 | 2 | satisfactory |
| | 121 | 2 | satisfactory |
| | 121 | 10 | cusps punctured |
| | 121 | 20 | cusps punctured |
| 0.030" LDPE black | 130 | 8 | cusps punctured |
| | 130 | 7 | satisfactory |
| | 140 | 8 | satisfactory |
| | 140 | 22 | cusps punctured |
| | 140 | 21 | satisfactory |
| | 147 | 27 | cusps punctured |
| | 147 | 26 | satisfactory |
| | 147 | 22 | satisfactory |
| | 130 | 1.5 | walls perforated |
| | 130 | 2.0 | satisfactory |
| | 140 | 2.0 | walls perforated |
| | 140 | 3 | satisfactory |
| | 147 | 2.0 | walls perforated |
| | 147 | 3 | satisfactory |
| | 125 | 2 | satisfactory |
| | 125 | 10 | cusps punctured |
| | 125 | 20 | cusps punctured |

In these experiments the upper temperature limit for "Flovic" was reached between 140°–145°C when the material started to smoke. The upper temperature limits for the low density polyethylene and high density polyethylene samples could not be reached using the limited heat available in the hot plate used to heat the samples.

What is claimed is:

1. A forming process of manufacturing an unperforated cuspated sheet comprising deforming a sheet of melt spinnable thermoplastic material by pressing against one face of a hot sheet of the material the cold outer tips of a first array of pointed pins and simultaneously pressing against the second face of the material the cold outer tips of a second array of projections so that the arrays interpenetrate in such a manner that the projections are spaced from the pins by a distance greater than the thickness of the sheet, thereby deforming the sheet so as to exhibit a plurality of hollow cusps having tips and side walls, the initial temperature of the hot sheet being in the range between the melting point of the thermoplastic material and the temperature at which the material becomes unworkable, the initial temperature of the tips of the arrays being less than the melting point of the thermoplastic material and the speed of interpenetration of the arrays being in the range above the speed at which the tips of the cusps of the product are punctured and below the speed at which the side walls of the cusps of the product are perforated, and subsequently withdrawing the pins and projections from the sheet.

2. A process according to claim 1 wherein the tips of the projections on each array interpenetrate by a distance twice the nearest distance between adjacent pins on the first array.

3. A process according to claim 1 for producing a singly cuspated sheet wherein the projections of the second array are in the form of an apertured grid through the centres of which apertures the pins of the first array penetrate.

4. A process according to claim 3 wherein the apertured grid is a hexagonal honeycomb and the array of pointed pins is arranged in a triangular lattice.

5. A process according to claim 1 for producing a doubly cuspated sheet wherein the projections of the second array are pointed pins.

6. A process according to claim 5 wherein both arrays of pointed pins are arranged in a square lattice and the pointed pins of one array pass through the centres of the unit squares of the second array.

7. A continuous process according to claim 1 wherein a molten sheet of thermoplastic material is continuously passed between the two arrays and wherein each array comprises a series of separately movable combs each comb extending across the width of the sheet and each comb comprising at least one row of projections, the opposing combs of each array being moved so that the pointed pins and projections interpenetrate, and the interpenetrated combs being moved along at the speed of the sheet until the sheet has set and the combs are then removed and recycled.

8. A process according to claim 1 wherein the thermoplastic material is selected from the group consisting of soda glass, borosilicate glass, low density polyethylene, high density polyethylene, high impact polystyrene, polypropylene, nylon 6, nylon 66 and nylon 610.

9. A process of manufacturing a cuspated sheet comprising providing a sheet of thermoplastic material in the form of a melt of a fluid nature, and forming a plurality of unperforated cusps in the melt by pressing against one face of the melt the cold outer tips of an array of pointed pins, and simultaneously pressing against the second face of the melt the cold outer tips of an array of cold projections so that the arrays interpenetrate in such a manner that the pins are spaced from the projections by a distance greater than the thickness of the melt, the rate of interpenetration being sufficient to form a sheet having said hollow cusps and not greater than that at which the melt cannot stretch sufficiently fast to avoid perforation of the cusps due to build up of tension at the points of contact between the melt and the arrays, and subsequently withdrawing the pins and the projections from the sheet.

* * * * *